United States Patent [19]
Barnes, Jr. et al.

[11] Patent Number: 5,123,317
[45] Date of Patent: Jun. 23, 1992

[54] SUPPORT STRUCTURE FOR A TABLE SAW BLADE ASSEMBLY

[75] Inventors: James F. Barnes, Jr., Anderson; Joseph A. Nosko; Walter E. Wehmeyer, both of Pickens, all of S.C.

[73] Assignee: Ryobi Motor Products Corp., Pickens, S.C.

[21] Appl. No.: 672,175

[22] Filed: Mar. 20, 1991

[51] Int. Cl.⁵ .......................... B27B 5/24; B27B 5/29
[52] U.S. Cl. ...................... 83/98; 83/477.1; 83/477.2
[58] Field of Search ............ 83/98, 100, 473, 477.1, 83/478, 666, 676, 477.2

[56] References Cited

U.S. PATENT DOCUMENTS

| | | | |
|---|---|---|---|
| 2,008,673 | 7/1935 | Ocenasek | 83/473 |
| 2,530,290 | 11/1950 | Collins | 83/473 |
| 2,752,959 | 7/1956 | Knapp | 83/473 |
| 2,850,054 | 9/1958 | Eschenburg | 83/473 |
| 4,721,023 | 1/1988 | Bartlett et al. | 83/100 |
| 4,896,572 | 1/1990 | Smyth et al. | 83/477.2 |
| 5,040,444 | 8/1991 | Shiotani et al. | 83/473 |

OTHER PUBLICATIONS

U.S. patent application Ser. No. 07/572,470, filed Aug. 27, 1990—Saw Blade Position Setting Apparatus, now U.S. Pat. No. 5,040,444, issued 8/20/91.
U.S. patent application Ser. No. 07/564,770, filed Aug. 9, 1990—Table Saw—Pending.

*Primary Examiner*—Hien H. Phan
*Attorney, Agent, or Firm*—Brooks & Kushman

[57] ABSTRACT

Support structure for a table saw blade assembly includes a cast aluminum bracket member with a rectangular opening upon which is movably supported the saw blade assembly. The bracket member is formed with a cavity for containing the saw blade and a discharge chute communicating with the cavity. A cover plate encloses the cavity. On the other side of the bracket member there are stiffening ribs for reducing the vibration of the bracket member. The density of the stiffening ribs increases as the distance from the opening decreases.

7 Claims, 7 Drawing Sheets

1

SUPPORT STRUCTURE FOR A TABLE SAW BLADE ASSEMBLY

BACKGROUND OF THE INVENTION

This invention relates to table saws and, more particularly, to improved structure for supporting the table saw blade assembly.

Table saws generally include a support frame and a working table mounted on the support frame. The working table is formed with an elongated generally rectangular opening through which the saw blade can project. The saw blade is typically circular and is part of a blade assembly which includes a motor for driving the blade. Mounted to and below the working table is support structure for movably supporting the blade assembly so that the blade assembly can be moved to vary the distance the blade projects through the working table opening and further to vary the inclination of the blade relative the surface of the working table.

In such apparatus, it is desirable to reduce vibration of the rotating blade assembly in order to reduce the noise generated by such vibration as well as to reduce the wear on component parts. It is also desirable to keep the vibration of the saw blade to a minimum so that smooth cutting of the work is affected. Further, it is desirable to be able to provide for the collection and discharge of debris generated by the cutting of the work.

It is therefore an object of the present invention to provide support structure for a table saw blade assembly which has all of the foregoing desirable attributes.

SUMMARY OF THE INVENTION

The foregoing, and additional, objects are attained in accordance with the principles of this invention by providing, in a table saw of the character described above, a bracket member including a generally planar plate with a generally rectangular opening therein for movably supporting, along edges of the plate opening which are transverse to the working table of the table saw, a blade assembly with a motor on a first side of the plate and a saw blade on the other side of the plate. The bracket member has walls on the other side of the plate defining with the plate a cavity for containing the saw blade. The bracket member is also formed with a discharge chute communicating with the cavity. The bracket member is further formed with a wall in the cavity for directing debris blown by the rotation of the saw blade into the discharge chute. On the first side of the plate, the bracket member is formed with a substantially rectangular pattern of stiffening ribs for reducing the vibration of the bracket member. There is also provided a cover plate member mounted to the cavity defining walls of the bracket member for enclosing the cavity and covering a lower portion of the saw blade.

In accordance with an aspect of this invention, there is also provided means for pivotably mounting the bracket member to the working table.

In accordance with another aspect of this invention, the bracket member is formed on the other side of the plate outside the cavity with a substantially rectangular pattern of stiffening ribs.

In accordance with a further aspect of this invention, the bracket member is formed of cast aluminum.

In accordance with yet another aspect of this invention, the pattern of stiffening ribs is denser where it is closer to the plate opening.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
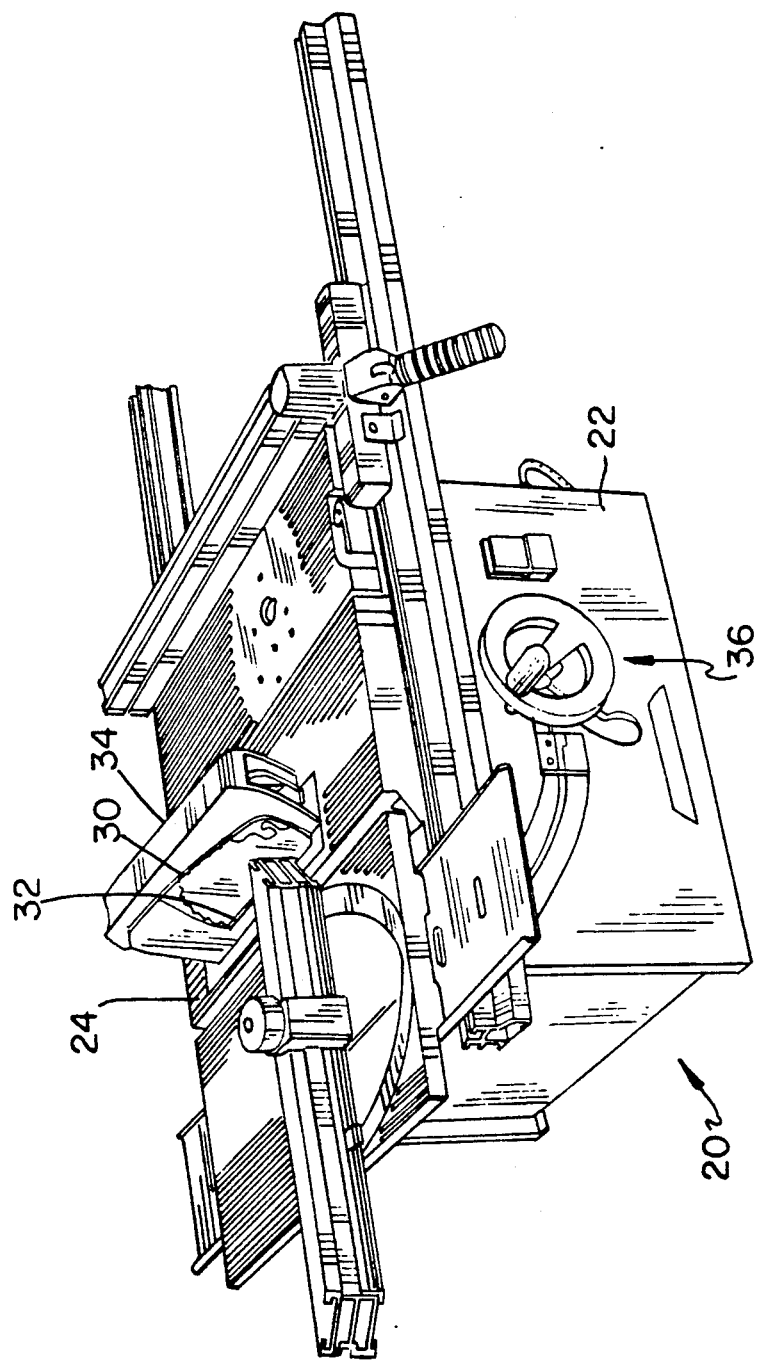
FIG. 1 is a perspective view of a table saw incorporating structure according to this invention.
Figure 2:
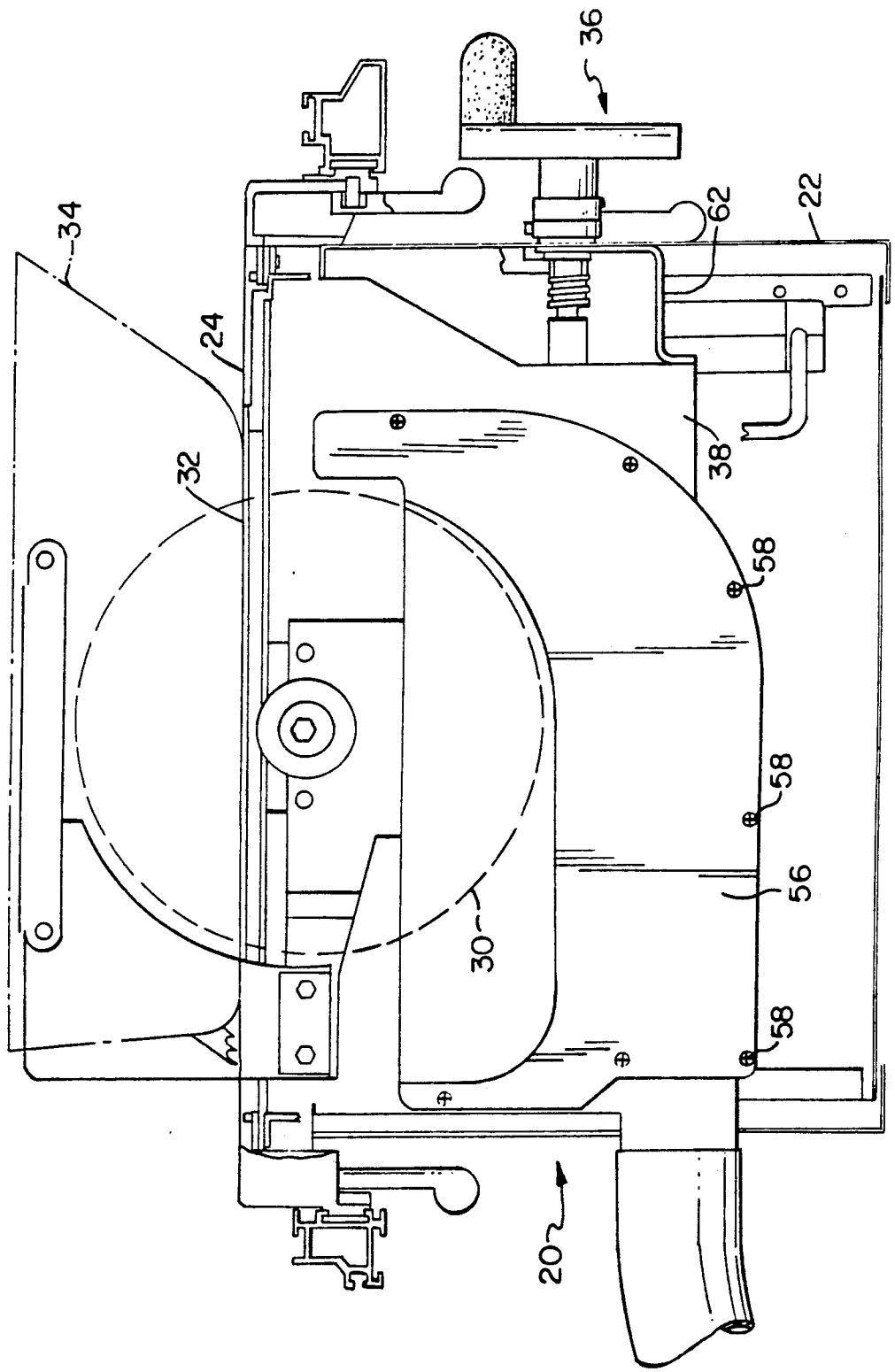
FIG. 2 is a cross sectional view, partly broken away, of the table saw shown in FIG. 1.

Referring now to the drawings, shown therein is a table saw, designated generally by the reference numeral 20 which includes a support frame 22 on which is mounted a working table 24. As is conventional, table saw 20 has a blade assembly 26 which includes a motor 28 and a circular saw blade 30 driven by the motor 28. The working table 24 has an elongated generally rectangular opening 32 through which the blade 30 can project, and on the working table 24 there is mounted a safety cover 34, preferably formed of a transparent plastic material, for covering the exposed portion of the saw blade 30. To the front of the support frame 22 there is mounted a blade adjustment mechanism, designated generally by the reference numeral 36, for varying the extent to which the blade 30 projects above the surface of the working table 24 and to vary the inclination of the blade 30 relative the surface of the working table 24.

According to this invention, there is provided a bracket member 38 on which the blade assembly 36 is movably supported so that the blade assembly 36 can be moved to vary the distance that the blade 30 projects through the working table opening 32. The bracket member 38 is pivotably supported on the working table 24 so that the inclination of the blade 30 relative the surface of the working table 24 may be varied.

The bracket member 38 is preferably a unitary cast aluminum piece which includes a generally planar plate 40 having a generally rectangular opening 42 which is adapted to support, along its edges which are transverse to the working table 24, the blade assembly 26 with the motor 28 on a first side of the plate 40 and the blade 30 on the other side of the plate 40. The bracket member 38 is formed with walls 44 on the other side of the plate 40 for defining, with the plate 40, a cavity 46 for containing the blade 30. The bracket member 38 is further formed with a discharge chute 48 communicating with the cavity 46. To assist in directing debris blown by the rotation of the saw blade 30 into the discharge chute 48, the bracket member 38 is also formed with a deflector wall 50, as best shown in FIG. 4.

Figure 3:
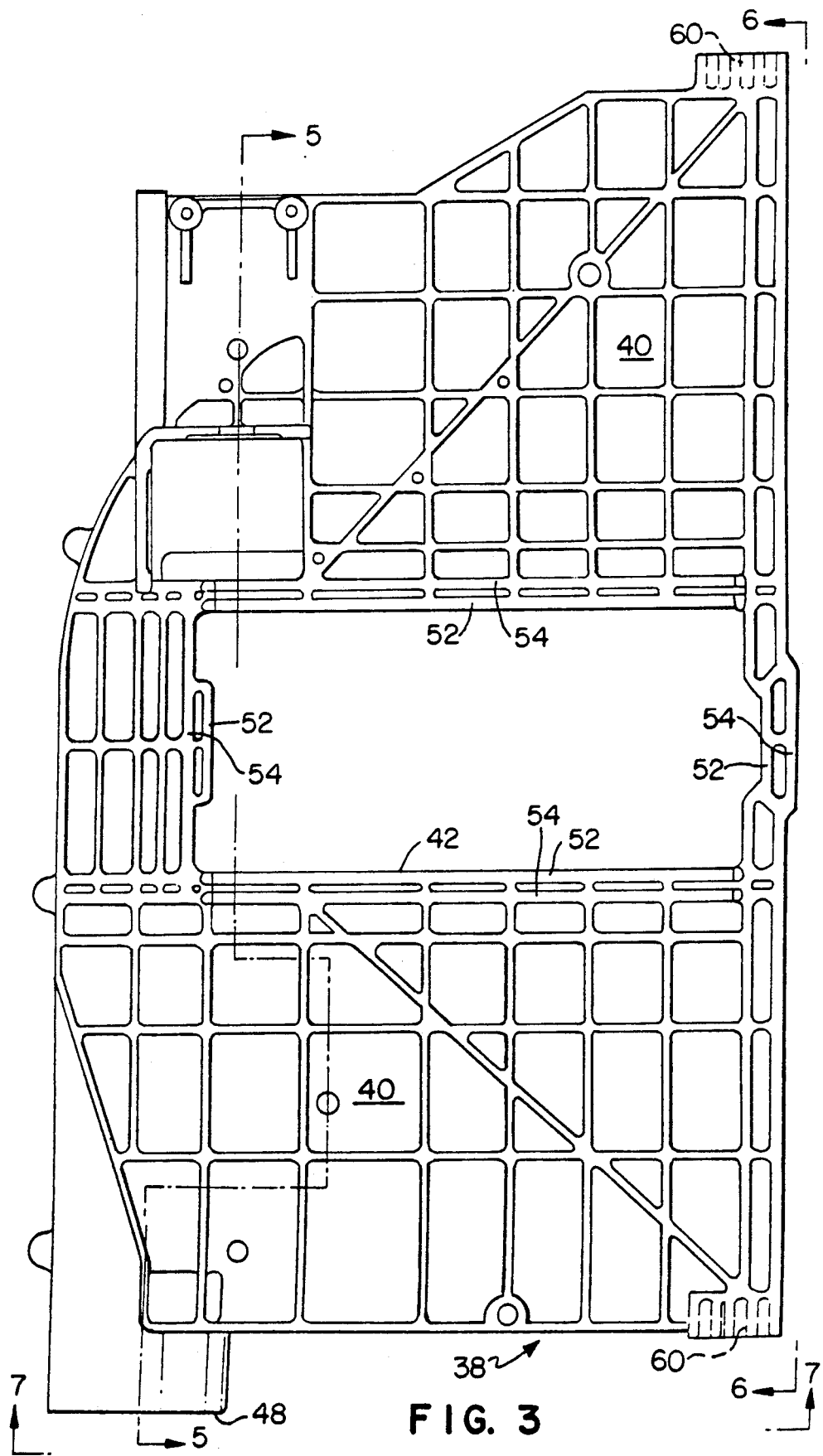
FIG. 3 is a plan view of the first side of the bracket member.

In order to reduce the vibration of the blade assembly 26, the bracket member 38 is formed with stiffening ribs. Since the blade assembly is mounted to the opening 42, it is more important to have stiffening structure closer to the opening than it is to have the stiffening structure farther from the opening. Accordingly, as best shown in FIG. 3, the first side of the bracket member 38 is formed with a substantially rectangular pattern of stiffening ribs which includes a closely spaced double row of ribs 52, 54 surrounding the plate opening 42, where the first row of ribs 52 defines the periphery of the opening 42. As the distance from the opening 42 increases, the separation between the ribs monotonically increases. Since less stiffening is needed at greater distances from the opening 42, this allows for reduced weight of the bracket member 38.

Figure 4:
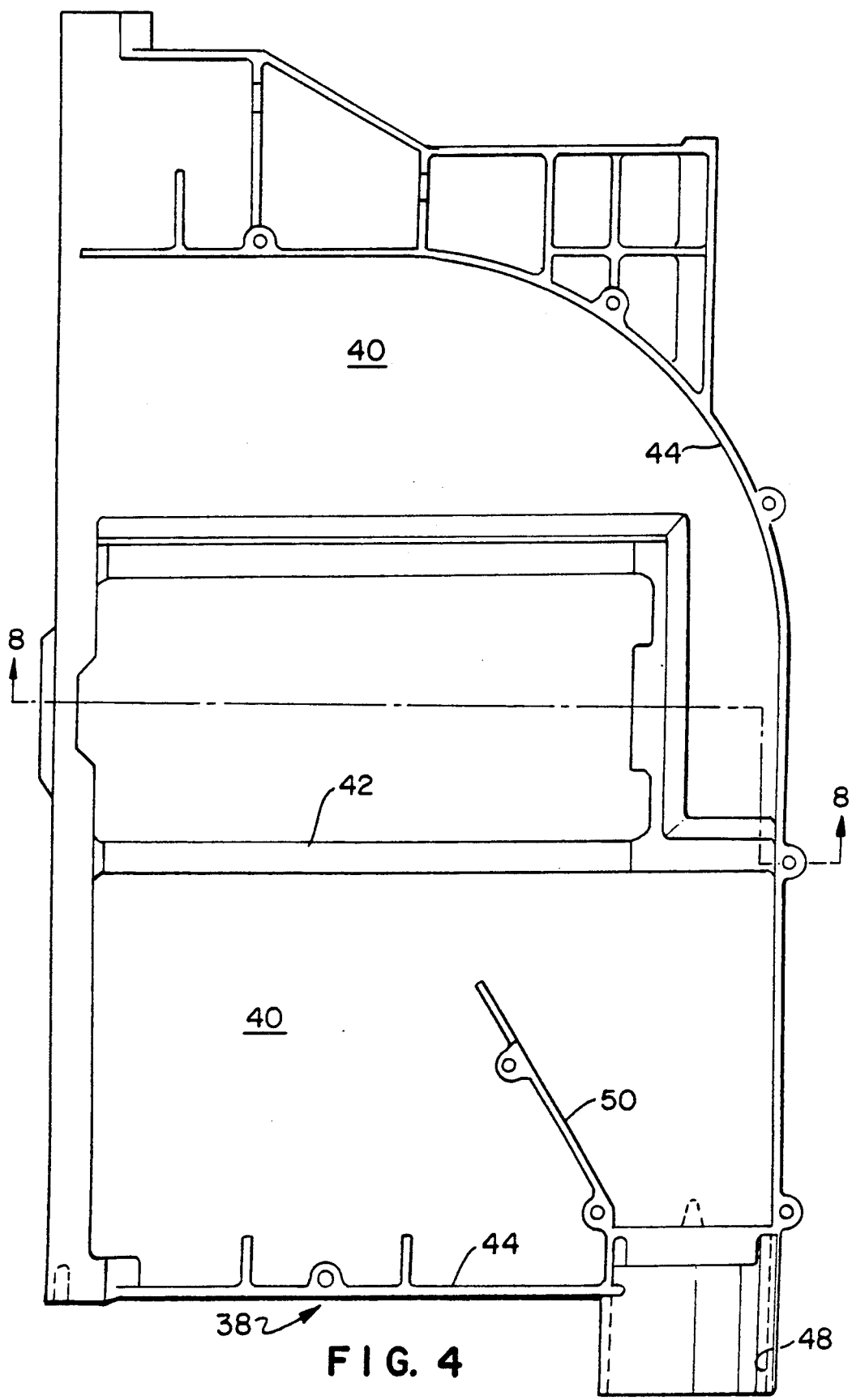
FIG. 4 is a plan view of the other side of the bracket member.
Figure 5:
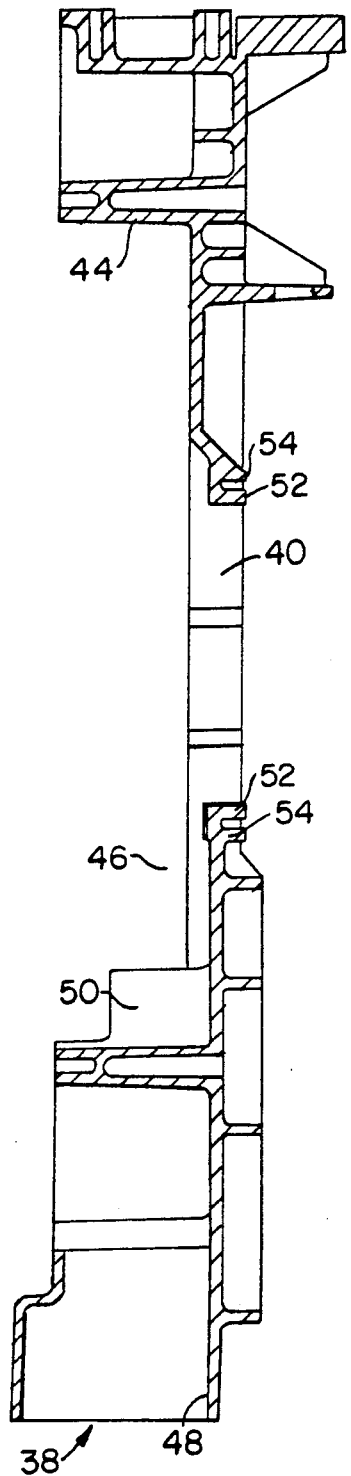
FIG. 5 is a cross sectional view of the bracket member, taken along the line 5—5 in FIG. 3.
Figure 6:
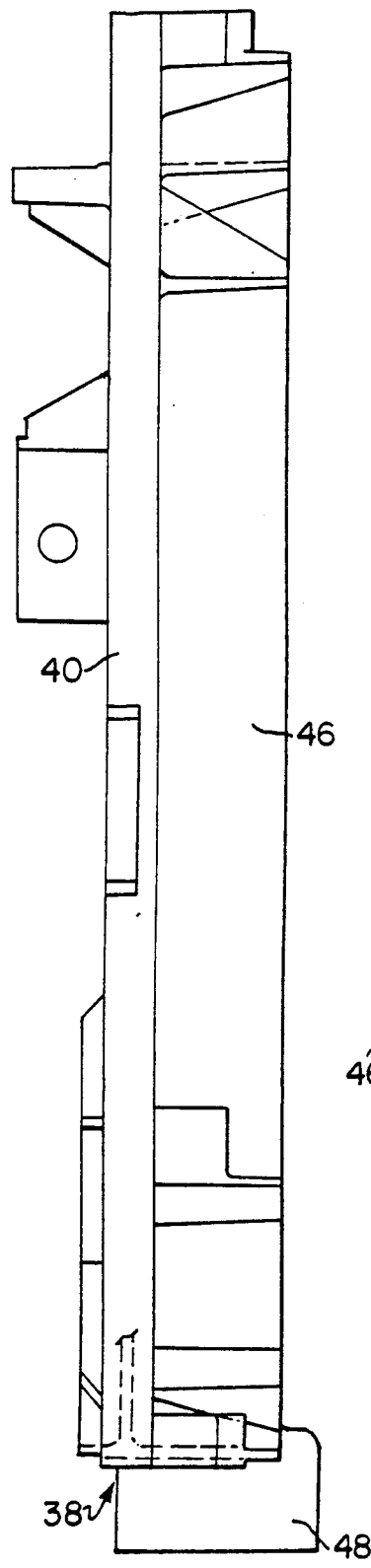
FIG. 6 is an end view of the bracket member taken along the line 6—6 in FIG. 3.
Figure 8:
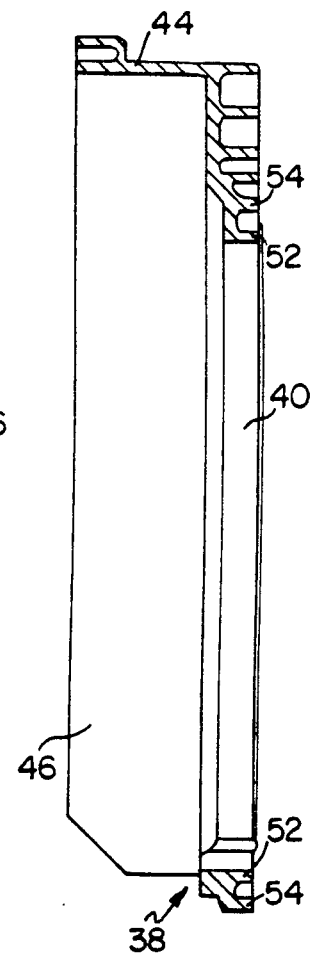
FIG. 8 is a cross sectional view of the bracket member taken along the line 8—8 in FIG. 4.
Figure 7:
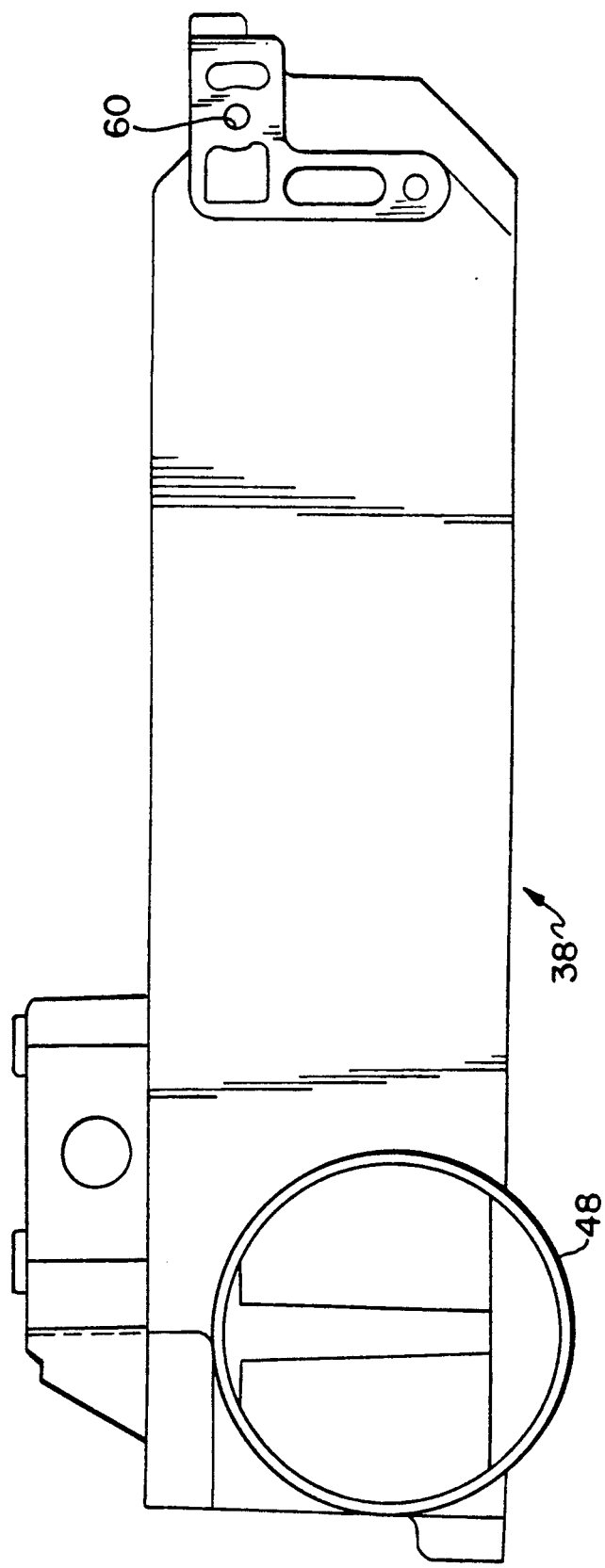
FIG. 7 is an end view of the bracket member taken along the line 7—7 in FIG. 3.
Figure 9:
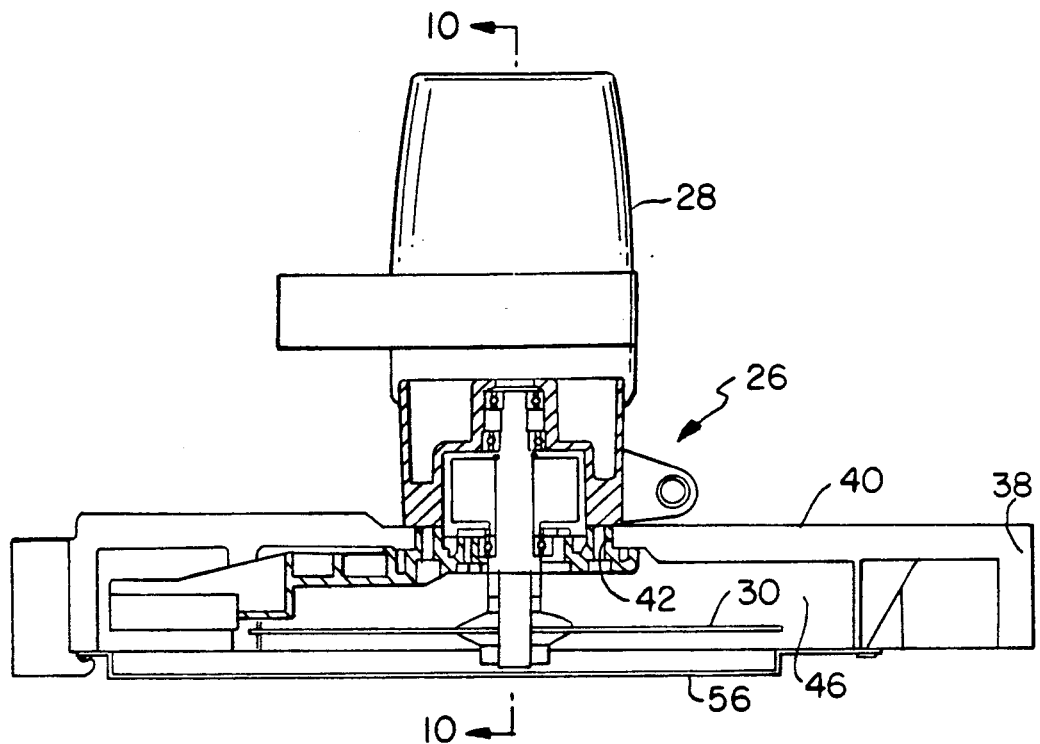
FIG. 9 is a top plan view, partly in section, of the blade assembly mounted on the bracket member.
Figure 10:
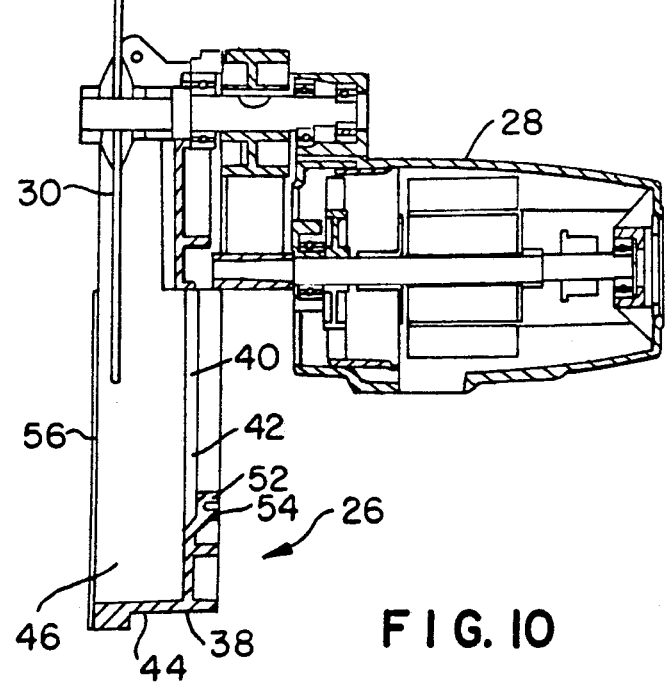
FIG. 10 is a cross sectional view taken along the line 10—10 in FIG. 9.

On the other side of the bracket member 38, as best shown in FIG. 4, the bracket member 38 is formed with another substantially rectangular pattern of stiffening ribs outside the cavity 46.

The support structure for the blade assembly 26 also includes a cover plate member 56 which is mounted to the walls 44 by screws 58 or the like for enclosing the cavity 46 and covering a lower portion of the saw blade 30.

In order to pivotably support the bracket member 38 to the working table 24, the bracket member 38 is formed with colinear blind holes 60 into which pivot pins held on the working table 24 may be inserted. A bracket 62 connected between the bracket member 38 and the blade adjustment mechanism 36 provides the connection by which the blade adjustment mechanism 36 can vary the inclination of the bracket member 38, thereby varying the inclination of the blade 30 relative the working table 24.

The above described structure possesses several advantages. Thus, the bracket member 38 has been so designed with the stiffening ribs that all objectionable resonant frequencies have been removed and there is virtually no vibration of the saw blade. This is a marked improvement over prior stamped steel bracket members. Additionally, it has been found that the rotation of the saw blade 30 within the cavity 46 has a venturi effect which directs the debris into the discharge chute 48 with such force that in order to collect the debris, all that need be done is to place a bag on the chute 48—no separate vacuum is required as is conventional. In addition, the motor cooling exhaust air is routed through the discharge chute 48, boosting the airborne dust carrying capability of the system in instances of use without a vacuum cleaner attached to the chute 48. The motor exhaust air flow adds to the air flow created by the blade rotation.

Accordingly, there has been disclosed an improved support structure for a table saw blade assembly. While an illustrative embodiment of the present invention has been disclosed herein, it will be apparent to those of ordinary skill in the art that various modifications and adaptations to that embodiment are possible and it is only intended that the present invention be limited by the scope of the appended claims.

We claim:

1. In a table saw having a blade assembly including a motor and a circular saw blade driven by the motor, a support frame, and a working table mounted on said support frame and having an opening through which said blade can project, support structure mounted to and below said working table for movably supporting said blade assembly in a manner that said blade assembly can be moved to vary the distance said blade projects through said working table opening, said support structure comprising:

a bracket member including a generally planar plate with a generally rectangular opening therein for movably supporting, along edges of said plate opening which are transverse to said working table, said blade assembly with the motor of a first side of said plate and the saw blade on the other side of said plate, said bracket member having walls on said other side of said plate defining with said plate a cavity for containing said saw blade, said bracket member being formed with a discharge chute communicating with said cavity, said bracket member being formed with a wall in said cavity for directing debris blown by the rotation of the saw blade into said discharge chute, said bracket member being formed on said first side of said plate with a substantially rectangular pattern of stiffening ribs for reducing the vibration of said bracket member; and a cover plate mounted to said cavity defining walls of said bracket member for enclosing said cavity and covering a lower portion of the saw blade.

2. The support structure according to claim 1 further including means for pivotably mounting said bracket member to said working table.

3. The support structure according to claim 1 wherein said bracket member has a substantially rectangular pattern of stiffening ribs formed on said other side of said plate outside said cavity.

4. The support structure according to claim wherein said bracket member is formed of cast aluminum.

5. The support structure according to claim wherein said pattern of stiffening ribs includes a closely spaced double row of ribs surrounding said plate opening.

6. The support structure according to claim 5 wherein a first row of said double row defines the periphery of said plate opening.

7. The support structure according to claim 6 wherein the separation between said ribs monotonically increases as a function of distance from said plate opening.

* * * * *